Jan. 21, 1969 D. SILVERMAN 3,423,743

RANDOM ACCESS MAGNETIC TAPE MEMORY SYSTEM

Filed Nov. 27, 1964

INVENTOR.

Daniel Silverman

RANDOM ACCESS MAGNETIC TAPE MEMORY SYSTEM

Filed Nov. 27, 1964 Sheet 2 of 3

INVENTOR.

Daniel Silverman

INVENTOR.
David Silverman

United States Patent Office 3,423,743

Patented Jan. 21, 1969

3,423,743

RANDOM ACCESS MAGNETIC TAPE MEMORY SYSTEM

Daniel Silverman, 5969 S. Birmingham, Tulsa, Okla. 74104

Continuation-in-part of application Ser. No. 158,000, Dec. 8, 1961. This application Nov. 27, 1964, Ser. No. 414,358

The portion of the term of the patent subsequent to Apr. 20, 1982, has been disclaimed U.S. Cl. 340—174.1 15 Claims Int. Cl. G11b *5/00*

ABSTRACT OF THE DISCLOSURE

This invention is concerned with the storage and retrieval of information in the form of magnetized spots or areas in specific patterns on a magnetizeable record medium. The record can be in the form of long strips, webs or other forms of medium in which a multiplicity of arrays of information spots can be recorded. A multiplicity of record handling devices are used to store, position and control one or more records in each device. A single central processing or scanning means is provided which can be placed in operating relation successively with each of the records in the record handling devices. The central processing means may take either of two forms. It may comprise a single reading means which can be placed in reading relation successively with each record in combination with a central control means that takes the electrical signals from the reading means and converts them to useful information signals for transmission or display. Or the central processing means may comprise a plurality of reading means, one placed in each of the record handling means, each of which can, in turn, be connected to the central control means.

Since there are multiple records in multiple record handling means, with only one reading means, each of the records are provided with index means to mark a plurality of sections. The record handling means each have index detection means and control means to position the records in each of the handling means to predetermined sections. This is done while the central processing means is reading a first record, so that as soon as the reading of the first record has been completed, the reading means can be placed in operating relation to a second record in a second handling means that has been prepositioned to the desired section. Thus, the central processing means do not have to read or scan all of the information on each record to find a unit of information, but only the small fraction comprising a specific section of a specific record.

This invention is a continuation-in-part of my copending application, Ser. No. 158,000, filed Dec. 8, 1961, now U.S. Pat. No. 3,179,001. It is concerned generally with the storage and retrieval of information on multiple record strips, at least part of the information being in digital or analog form. More particularly, this invention is concerned with the storage and retrieval of information in the form of patterns of magnetized spots on long plastic strips coated with a layer of magnetizable material, or on strip records of other physico-chemical composition.

In my copending application, Ser. No. 158,000, I show how, by the use of multiple strip handling means, through each of which can be run at least one information strip, carrying information at least part of which is in the form of patterns of spots of recognizable character, and how, by the use of a central scanner capable of reading the information, and capable of being placed rapidly in operating relation with any selected one of the strip handling units, any part of any strip in the storage system can be scanned and read. The information recorded in the form of patterns of spots can, of course, be either digital or analog information. If, in addition, each of the strips is divided longitudinally into discrete sections, each of which is identified by a section index of recognizable character, though different from that of the information spots, and if each strip handling unit is provided with an index detector, and with an appropriate control system, then each of the strips can be pre-positioned or preselected to a desired section, without the central scanner being used. Thus the central scanner can be scanning one strip and reading the information thereon, while simultaneously one or all of the other strips can be prepositioned to desired sections ready for the central scanner to read the information thereon.

In my application, Ser. No. 158,000, I pointed out that the information can be partly or completely in the form of patterns of spots, that is, digital or analog, with the remainder being pictorial. I also described a number of systems that can advantageously utilize the invention described in that application. It will be clear, of course, that within the broad concepts of my invention the information strips need not necessarily be photographic, but they can be magnetic, capacitive, xerographic, etc. In this application I will point out more in detail how my invention can be applied to magnetic as well as to other digital information record systems.

The principal objective of this invention is therefore to provide a nonphotographic information storage system of very great storage capacity in which at least part of the information is in digital or analog form that can be searched and the information retrieved on a random basis with great speed. Another important object is to search a large magnetic information system for a specific item of information without having to scan or read the entire information storage. Another objective is to provide a large multistrip digital storage system in which the strips can be pre-positioned to desired sections without the use of the central scanner and without reading the information. Another objective is to provide a multistrip digital or analog information system in which the information strips can be preselected to desired sections out of operating relation, that is, off-line, to the central scanner, and out of contact with the scanning apparatus or reading heads, with consequent less wear on the heads and on the strips.

Another objective of this invention is to provide a large volume multitape information system of the magnetic type on which the information can be recorded anc updated rapidly, and in which information can be recordec in random order in specific addresses without having tc scan or read the entire information store to locate the desired addresses.

In order to facilitate an understanding of other anc further objects and the principles of my invention, refer ence will be made to the several embodiments thereo illustrated in the accompanying drawings forming par of this application. Although specific language will b employed, it will nevertheless be understood that variou further modifications of the devices illustrated herein such as would fall within the province of those skilled i the art to construct, are contemplated as part of the pres ent invention. In the drawings.

Figure 1:
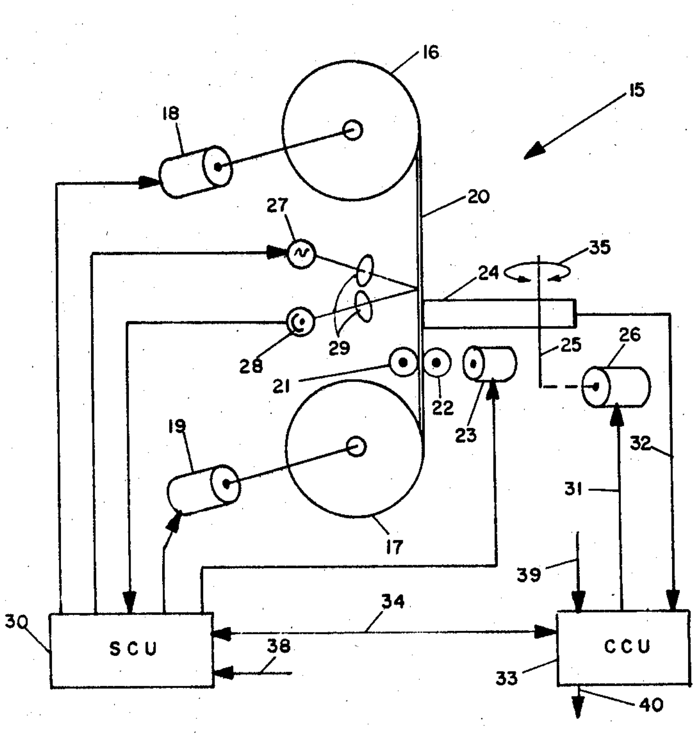
FIGURES 1 and 2 show schematically one embod ment of the system of this invention.
Figure 2:
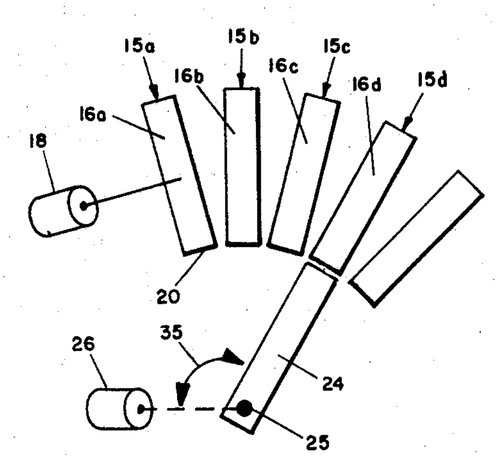

In FIGURES 1 and 2, I show schematically one embodiment of my invention. This comprises a multiplicity of information strip handling units 15, each comprising a pair of reels 16, 17, on which the strip or tape 20 is wound. The strip 20 can be run from one to the other reel by control of the drive motors 18, 19, driving reels 16 and 17, respectively. A pair of drive rollers 21, 22, driven by constant speed motor 23 assure constant speed of traverse of the strip past a scanner 24. The scanner 24 is mounted on a vertical axis 25 and is capable of rotation in either direction 35 about this axis by motor 26.

The group of strip handling units 15 are arranged in radial symmetry about axis 25, so that by rotation about this axis the scanner 24 can be placed in operating relation to any one of the strips 20 in the various strip handling units 15. As shown in my copending application, S.N. 158,000, other geometric relations can be provided between the units 15 and the scanner 24.

Figures 3, 5, 5A, 8, 10:
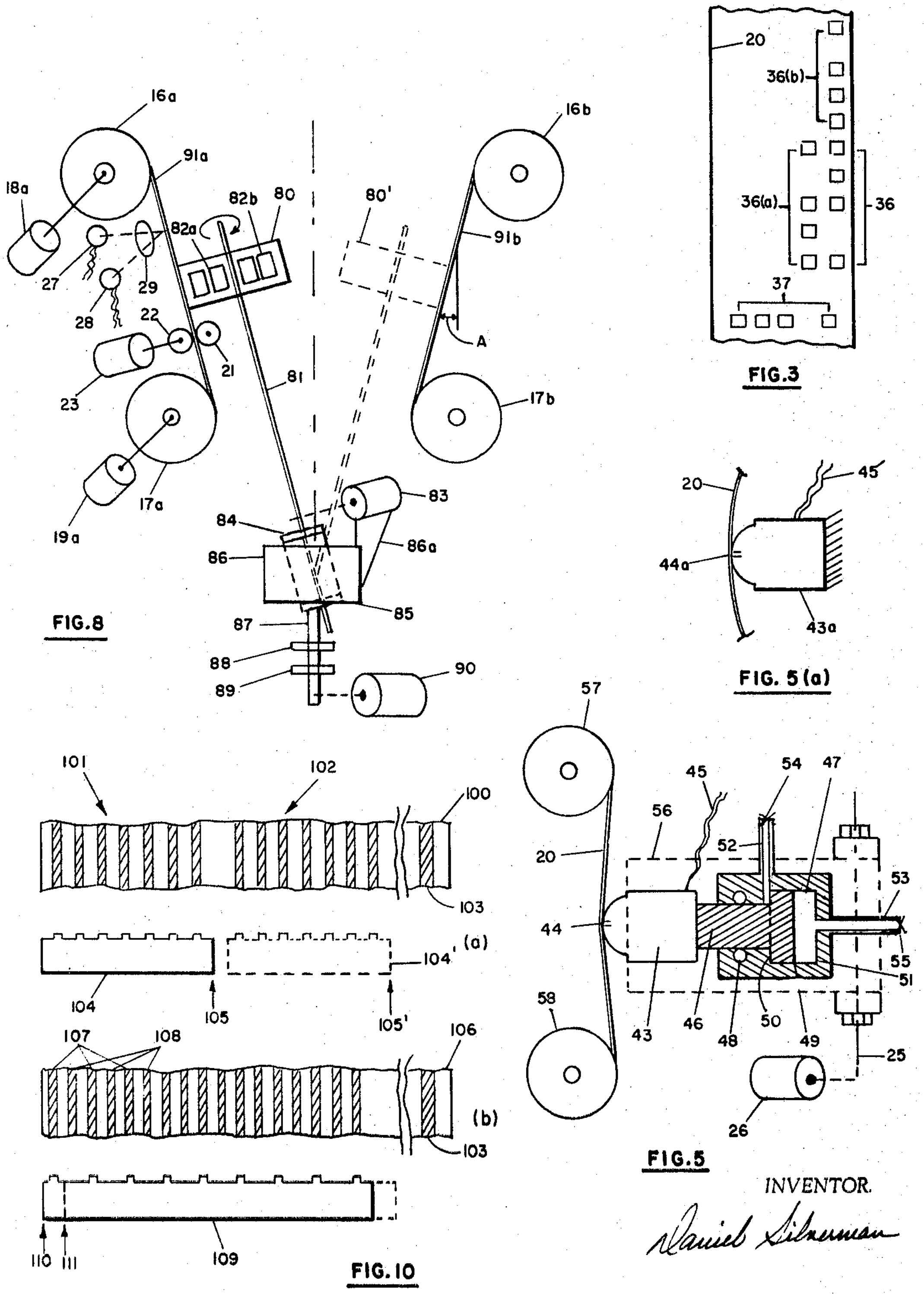
FIGURE 3 illustrates possible patterns of spots repre senting the index means marking the sections of the strip
FIGURES 5 and 5(*a*) show schematically details of the central scanner means.
FIGURE 8 represents schematically another embodiment of this information system adapted to use videotape.
FIGURE 10 shows possible track arrangements when there are more than one set of information tracks.

In association with the strip 20 is a series of section indexes. These can be simple or complex spot patterns identifying a multiplicity of portions or sections, into which the length of the strip 20 is divided. As shown in FIGURE 3, these can be arranged in a longitudinal spot pattern 36, or a transverse pattern of spots 37. These can be placed on the strip in any one of many ways, as is well known in the art. For example, they can be photographic spots of an opaque or translucent nature, light reflective spots painted or printed on, or applied to the strip or tape, magnetic or electrostatic spots, perforation, etc. By the use of a light source 27, lens system 29, and photoelectric detector 28, a light reflective spot on the strip can be easily detected as it passes from reel 16 to 17. Of course, other equivalent systems can be supplied, as is well known in the art. By the use of a simple strip control unit 30, the passage of the reflective spots, say 36, can, with appropriate logic circuits, control the movement of the strip 20 so as to stop the strip when a particular index pattern appears. Circuits such as these are used in many ways in industrial instruments, such as magnetic digital computers, and similar systems, for which the art is well developed. Since the electronic circuitry required to accomplish these control operations are not part of this invention, it is not felt to be necessary to describe this circuitry further. The Benson-Lehner "Flip" manufactured by the Benson-Lehner Corporation of Santa Monica, Calif., the I.B.M. "Walnut," manufactured by the International Business Machines Corporation of New York, N.Y., The National Bureau of Standards "Microfilm Rapid Selector," and other similar devices, all utilize this general type of logical circuitry. U.S. Patent No. 2,873,912, "Electronic Comparator," describes in detail the circuits for construction of an electronic comparator for comparing patterns of spots, such as the index pattern, with a preselected pattern. There are also textbooks on computers, such as "Computer Logic—The Functional Design of Digital Computers" by Ivan Flores, Prentice-Hall, Inc., 1960, which describes many logic circuits for making comparison of spot patterns, and as the result of the comparison taking particular control steps previously decided upon. U.S. Patent No. 1,889,575, "Method and Apparatus for Reading Books," No. 2,121,011, "Method of and Apparatus for Indexing and Phototranscription of Records," and No. 2,830,285, "Storage System," and many others show various types of scanning and control systems that might be adapted to the type of system described in this application.

While I have shown the index spots on the reverse side of the strip from the scanner, they may be of any physico-chemical composition, and be mounted on either surface of the strip, as is well known in the art.

In FIGURE 3, I show one column of spots 36 and a parallel column 36(*a*). The patterns 36 and 36(*a*) are reversed with respect to each other so that while the strip is moving in one direction one column can be scanned to read the index, and the other column used for reverse movement of the tape. By this means the strip can be pre-positioned by moving the strip in either direction. Of course, the transverse pattern 37 can be read with the strip moving in either direction, but it requires a more complicated reader. Also, the column 36(*a*) can be placed on the same track as 36, in the form 36(*b*), instead of on a second track as illustrated.

I have shown leads 31 and 32 leading respectively from the drive motor 26 and scanner 24, to the central control unit 33, which is also connected by leads 34 to the strip control unit 30. The central control unit (CCU) 33 is equipped with logic circuits to read the signals provided by the scanner 24, and to provide the necessary control signals to motor 26, and, through strip control unit 30, to motors 18, 19, and 23. These logic and control systems as used in 33, are well known in the art. In particular, they are described in the literature, as stated above. Since they form no part of this invention and are well known in the art, there appears to be no necessity for describing them further. In this way, the system details of this invention can be described more clearly without the great mass of detail that would be required to describe the logic and control circuits.

It will be clear that while the CCU must control all of the drive motors, it can only do so in connection with the reading of the digital information on the strip. The section index marks on the strip are preferably of a different physico-chemical composition from that of the information marks or spots, and thus unreadable by the scanner, and are preferably read by a different reading system so that the motion of the strip in preselection can be carried out independently of the central scanner and its CCU.

Control information to the strip control unit (SCU) to instruct it to pre-position a strip in its strip handling unit can be provided through line 38 from outside the system, or through the CCU and line 34. Similarly, control information to the CCU 33 from outside the system is provided through line 39. Information read from the strip is carried by line 40. While I have shown each strip handling system comprising a single pair of reels and one long strip, it will be clear that multiple strips can be arranged to be driven successively through each of the strip handling units as described in my copending application, S.N. 158,000.

In FIGURES 1 and 2, I show the scanner 24 as a central unit that can be placed in operating relation selectively and successively with the strips in each of the strip handling units. While this can be an optical scanner as shown in my copending application, S.N. 158,000, it can also be a magnetic recording system, and I will describe such an embodiment.

Figure 4:
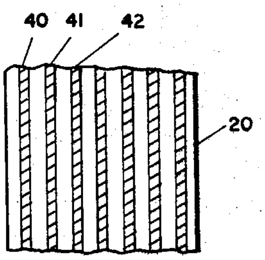
FIGURE 4 represents one of the possible patterns c tracks of information.

Assume that the information strip is a strip of thin plastic ribbon coated with magnetizeable material, such as the commercial magnetic tapes, and that it has (as in FIGURE 4) a multiplicity of parallel recorded tracks of digital information 40, 41, etc. To read these tracks, the scanner or reading device 24 must have a set of reading heads in exact lateral alignment with these tracks. Such a system of recorded digital information tracks and reading heads are described in my copending application, S.N. 84,026, filed Jan. 23, 1961, now U.S. Pat. No. 3,158,846.

In FIGURE 5, I show one embodiment of such a scanner. It comprises a plurality of magnetic reading heads 43 placed side by side in the same spacing laterally as the tracks 40, 41, etc. These have their air gaps 44 aligned perpendicular to the length of the strip. The faces of the reading heads 44 are generally smooth and rounded and the magnetic tape 20 is adapted by means of rollers 57, 58, to move smoothly over the heads. The head is mounted inside a housing 56 adapted to be rotated about axis 25 by motor 26 by means not shown but well known in the art.

The heads 43 are mounted on a short piston 46 adapted to slide inside cylinder 47. The piston is sealed by O ring 48. Fluid pressure applied through valve 54 and passage 52 will force the piston back to the end 51 of the cylinder, thus removing the heads 43 out of contact with the strip 20, and permitting the scanner to be rotated to a different position and there to be brought into contact with another strip in another strip handling unit (SHU). When the scanner is rotated to the proper azimuth, the heads are brought into contact with the strip by applying fluid pressure through valve 55 and passage 53 to the end of the piston. Of course, other means for advancing and withdrawing the heads can be used, as is well known in the art.

It will be clear that while the scanner is in contact with one strip, it is out of contact with all other strips and they can be driven and placed in any desired longitudinal position by passage over their rollers 57 and 58, without rubbing contact with the scanner heads, and thus without wear on the heads and the strips. For convenience in describing the action of the tapes in the THU and the central scanner, I will designate that portion of the THU between the reels, or more specifically between rollers 57 and 58, where the scanner or reading heads act on the tape as the scanning gate, reading gate, or simply, gate.

The heads 43 do not alone constitute a scanner, since the logic and control circuits of the CCU are required to fully activate the scanner. By rotating the scanner it can successively be placed in scanning or operating relation with each of the information record strips. The time order or sequence of placing the scanner into operating relation to each of the strips is at the choice of the CCU. Whenever a predetermined section of a selected strip is in the reading gate of the SHU, a signal is sent from the SCU 30 to the CCU 33, as is well known in the art, and the scanner can then be directed by the CCU to read that strip.

If the magnetic record strip is composed of a great number of recorded tracks, as described in my copending application, S.N. 84,026, the scanning head system will be very complicated and expensive. In that case, a single scanner system capable of being placed successively in operating relation to each of the SHU, as shown in FIGURES 1 and 2 will be desirable. On the other hand, if the number of tracks is limited to the present standard 7 tracks per half inch wide tape, it may be more convenient to mount a separate set of reading heads 43 on each of the SHU, much in the manner of the present day computer magnetic tape units. This is shown in FIGURE 5(*a*) where the heads 43(*a*) are shown mounted on the SHU in such a position that the gaps 44(*a*) contact the strip 20 in the proper manner.

While much of the apparatus I have described so far bears some similarity to corresponding parts of present day magnetic digital computer devices, my system differs from the conventional magnetic digital computer systems and magnetic tape units, in several important respects. (1) In the system of this invention, the tapes or strips, in addition to having multiple longitudinal tracks of digital information recorded on them, have marked on them at predetermined intervals of length, identifiable index marks, which divide the length of the strips into multiple parts or sections, which serve as precise addresses for the information recorded on the strip. The sections can be as short or as long in length as necessary or desirable to provide the most efficient and fastest retrieval. The index marks are preferably of a different character from that of the information spots. (2) The strip handling units, in addition to their reading heads (or scanner) that read the digital information, have index detecting means for the purpose of reading the index marks and so to provide signals to the SCU 30 to drive, and/or stop the strip in the desired position. (3) All of this is done without the use of the information reading heads and the CCU, which, instead of remaining in contact with the strips while they are being preselected, can be removed from contact by means such as that of FIGURE 5, or equivalent means, as is well known in the art.

If each strip handling unit has its own information reading heads, (as in FIGURE 5(*a*)), then the scanner, which comprises the reading heads in conjunction with the CCU, can be switched very rapidly to any desired SHU by simply connecting the reading heads of the SHU 43(*a*) to the CCU.

Figure 6:
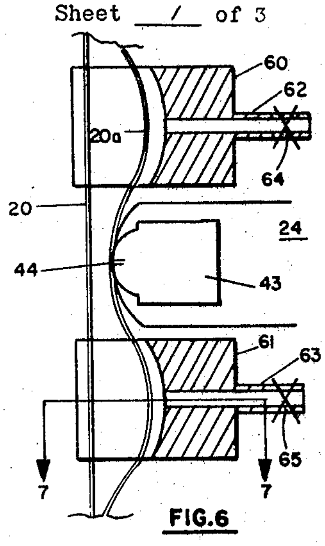
FIGURES 6 and 7 show schematically details of one means for providing operating contact between the information tape and the scanning means.

Another embodiment of this system is shown in FIGURE 6 in which a different method is shown for applying the digital strip to the recording head. In FIGURE 5, I showed how the recording head might be pressed against the strip by the use of fluid pressure against a piston. In FIGURE 6, I show how application of a vacuum can deflect the strip until the strip and the heads are in recording contact.

Figure 7:
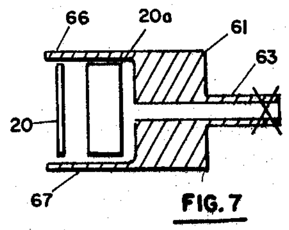

Associated with each tape are two tape guides 60 and 61, placed respectively above and below the scanner 24, with the recording heads 43, with their gaps 44. As shown in FIGURES 6 and 7, these comprise blocks of metal or plastic each with side walls 66 and 67 to guide the strip laterally, and a central opening connected to pipes 62 and 63 to which vacuum can be applied. When vacuum is applied the tape 20 is deflected to position **20*a* by the vacuum and thus is in operating contact with the heads 43. On release of the vacuum the tape, guided by rollers 57 and 58 returns to its nominal position 20**.

Out of contact with the tape, the scanner 24 can be turned to another tape in another THU. Of course, fixed heads 43(*a*) of FIGURE 5(*a*) can be used with each of the tapes in the several THU. Then when vacuum is removed from pipes 62 and 63, the tape 20 is out of contact with the heads, and can be run in either direction to be positioned to a desired section without interference with the heads, or wear on the tape or the heads.

In the conventional digital computer system, information is stored in binary or bit form, that is, in patterns of magnetized spots on a strip of magnetic tape. These bits of information are in the form of isolated magnetized areas, usually arranged in a plurality of columns or tracks. As will be explained further in connection with FIGURE 16, the spots or magnetized areas will be lined up in the tracks, and when spots are present, will be equally spaced along the tracks. However, each possible position of a magnetized spot carries information even though a particular spot is not magnetized. It is this pattern of magnetized and nonmagnetized areas or areas of different magnetization that carries the information. Conventionally there are seven tracks spaced across a one-half inch wide tape, although other combinations are in use and still others are possible.

There is an other system of storage of information in the form of one or more tracks of magnetized areas. These are not necessarily isolated (that is, separated or spaced apart), magnetized spots as in the digital form, above, but may be contiguous areas of magnetization representing analog information. Such a track would comprise a mor or less continuous band of magnetization along the track, with the intensity of magnetization along the strip varying in accordance with the analog information.

Both of these types of information records, that is, patterns of isolated magnetic areas of substantially constant intensity of magnetization, though of direct or opposite polarity (digital), and the contiguous areas of magnetization (analog), that is, patterns of areas of different intensity of magnetization, come within the field of interest and application of this invention. Thus the pattern can be one of geometry, of spots of equal or variable intensity of magnetization, both of them comprising patterns of spots of magnetization. Although the physical apparatus and circuits might be considerably different for these two systems, both types of information strips store and recover information recorded as magnetized spots, in at least one column of spots, arranged on long strips or tapes of magnetizeable material.

There is still a third form of magnetic storage in which the information is recorded on long strips of magnetizeable tape. This is the so-called "Videotape." Such equipments are in current use in television operations and in other processes of information handling. Commercial equipments are manfactured by the Ampex Corporation of Redwood City, Calif., and by the Radio Corporation of America of Camden, N.J., and other manufacturers.

Figure 9:
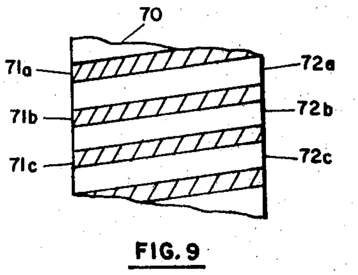
FIGURE 9 shows the track arrangement on the tape of the videotape system.

In the Videotape system, the information is recorded in the form of tracks of contiguous spots or areas of magnetization. The patterns of intensity of magnetization of the spots in the tracks comprise the information stored. Furthermore, the tape or strip is generally of greater width than the conventional computer tape. Generally it is of two-inch width, and the tracks of information run transverse to the length of the strip. This is illustrated schematically in FIGURE 8. The tape 91(*a*) is held on reels 16(*a*) and 17(*a*) which are driven by motors 18(*a*) and 19(*a*), respectively. Also, drive rollers 21 and 22 driven by constant speed motor 23 may be used to provide the proper constant speed of traverse of the strip from one reel to the other. The recording or reading heads 82(*a*), 82(*b*), etc., are set flush in the circumferential surface of a cylindrical drum 80 mounted on a shaft 81 driven by constant speed motor 83. The spacing of the heads tangentially is related to the width of the strip that is, as one head is completing its sweep across the tape, the next head is just beginning its sweep. The rate of rotation of the drum 80 is related to the speed of traverse of the strip such that 82(*a*) traversing the strip will record track 71(*a*), FIGURE 9, and then head 82(*b*) will record track 71(*b*), and so on. The proper spaces 72 between tracks 71 will be formed to isolate the tracks and to prevent crossfeed from one track into the head reading an adjacent track.

In accordance with this invention I can provide a plurality of tapes 91, reels 16 and 17, arranged in radial symmetry as in FIGURE 2. Here, however, I prefer to have the strips tilted at an angle A from the vertical. The shaft 81 on which the drum 80 is mounted is journaled at this angle in bearings 84, 85, in a structure 86 which is itself adapted to rotate about a vertical axis by means of shaft 87, and bearings 88, 89. Motor 90 is used to rotate structure 86 so that the head drum 80 can be placed in contact with any one of the radially symmetrical tape systems, such as 91(*b*), etc. Thus the rotating head system 82 can be rapidly placed in operating relation to any one of the tapes in accordance with control signals to motor 90. Means such as shown in FIGURES 5 and 6, or their equivalent, can be used to make reading contact between each of the strips and the rotating head system. As in FIGURE 1, the strip or tape 91 will have appropriate section index marks, as in FIGURE 3, applied to the strip, and the strip handling unit will have appropriate index detection means, such as the lamp 27, lens system 29, and photoelectric detector 28, or equivalent, as is well known in the art. The strip control unit (SCU) 30 and the central control unit (CCU) 33, as in FIGURE 1, will, of course, be necessary with this magnetic information strip reading system.

In my copending application, S.N. 158,000, I point out how the information strip can carry a multiplicity of columns of information. Part of this can be digital or analog and one or more columns can be pictorial. In FIGURE 10(*a*) I show how multiple groups of magnetic information tracks can be placed on a single strip or tape. Consider, for example, that a conventional magnetic head system is adapted to read seven tracks per one-half inch of tape. However, on a wide tape, say 2 inches wide, we could have four such systems of seven tracks. Thus strip 100, for example, might have a multiplicity of track systems, of which only two sets, or systems, or groups, 101 and 102, are shown for convenience. Each set 101 and 102 may comprise the conventional seven tracks in conventional spacing. Thus the conventional head system 104 of seven heads, when in position 105 will read track system 101, and when in position 105' (shown dotted) will read track system 102. Of course, some means of aligning the heads and tracks will be required to ensure that the proper head is on the proper track. One way of doing this will be described below. The method employed in my copending application, S.N. 84,026, filed Jan. 23, 1961, can also be used to provide this alignment.

In FIGURE 10(*b*) I show another arrangement of heads and tracks which can provide a plurality of track groups that can be read successively by a single head system. As in FIGURE 10(*a*), I show here for convenience the same 14 tracks, although as many tracks can be used as it is possible to provide recording heads in the space of the width of the tape. In FIGURE 10(*b*) I have interspersed the tracks of one group in between the tracks of the other group. The head system is now almost as wide as the entire group of tracks, but the heads of each group are spaced at the interval of two track spaces. Thus tracks 107 are in one group while tracks 108 are in the other group. The same principle applies for as many groups as desired. Similarly, the heads of the head assembly 109 are spaced at two track spaces. To shift from one set of tracks to the other, it is only necessary to move the head assembly 109 from position 110 to position 111, the amount of one track space on the tape. This permits extremely rapid shifting of the head 109 from one track group to the other.

On the edge of tape 100 I show an isolated track 103. This is a control track placed on the tape in precise geometric spacing from the information tracks 101, 102, or 107, 108, etc. This track with appropriate signal recorded thereon and appropriate detectors and servo system can serve to keep the tape 100 positioned relative to the head 109, or vice versa, so that the reading heads will be accurately aligned with the information tracks. It will be clear that the inforamtion recorded can be either digital or analog.

Figure 11:
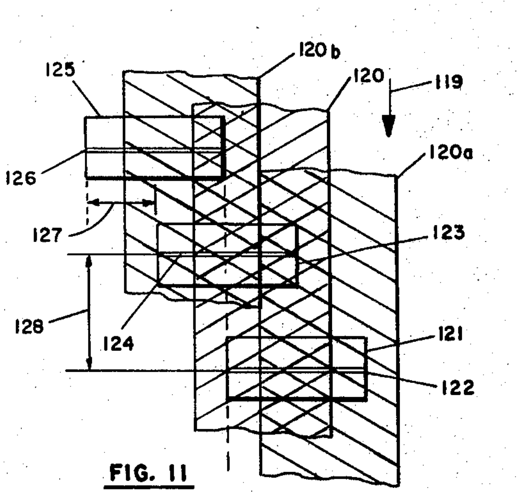
FIGURE 11 shows possible head arrays to be used in conjunction with a control track to provide alignment between the information tracks and the reading heads of the central scanner.
Figures 12, 13, 16:
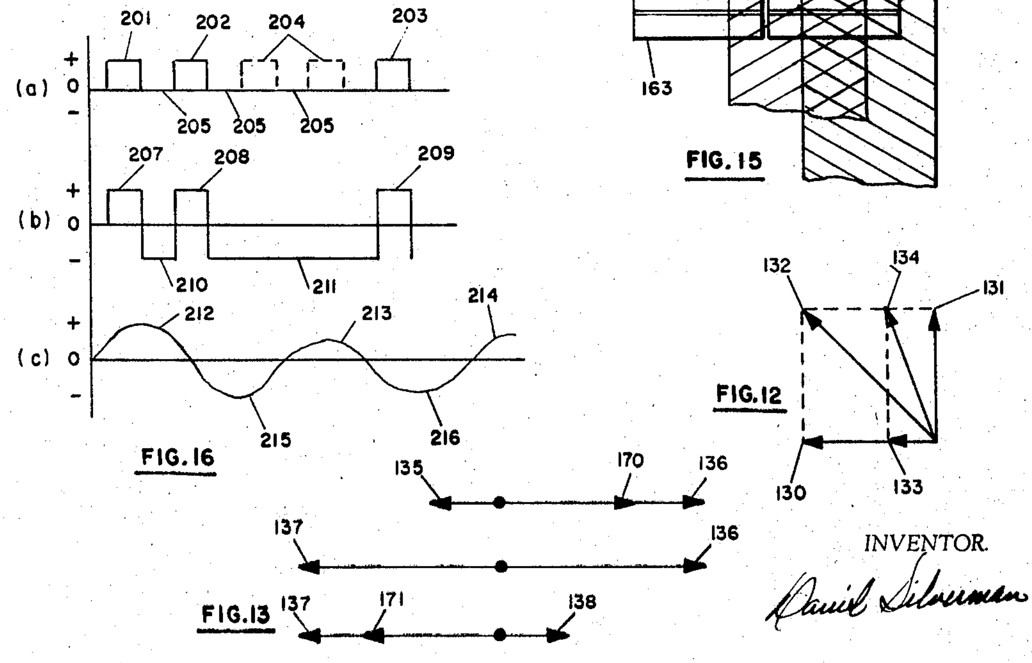
FIGURES 12 and 13 represent vector diagrams of the signals detected by the heads of FIGURE 11.
FIGURE 16 shows some forms which the patterns of magnetization on the information tape may take.

In FIGURE 11, I show the crosshatched band 120 to represent the track 103 to enlarged scale. The rectangle 121 represents schematically a reading head with gap 122, and the same for heads 123 and 125, etc. These heads 121, 123, 125, etc., are displaced longitudinally and laterally with respect to each other. Consider that the strip 120 moves in the direction of the arrow 119. If we record a sinusoidal signal on track 120 it will be read by heads 123 and 121, with the phase of the signal earlier on head 123. Assume that the frequency, speed of tape and longitudinal spacing 128 are so chosen that the phase of the signal on 123 is 90 degrees earlier than that on 121. By adding the outputs of the two heads, the resultant is an A-C voltage of the same frequency, but of a phase intermediate between that of both head signals. In FIGURE 12, I show a vector diagram in which vector 130 represents the voltage of head 123, the leading head, and 90 degrees later, the vector 131 representing the voltage on head 121, the lagging head. The resultant sum of these two vectors is 132 which has a phase 45 degrees later than 130. If now the track should move to the right to the position of the reverse crosshatched band 120*a*, the track will cover a smaller portion of gap 124. Thus head voltage on 123 will be cut to ⅓ of its original value, to vector 133, while voltage on head 121 will be the same, 131. The resultant is now vector 134 which now lags the vector 130 by a much larger angle than the 45 degrees of vector 132. Thus, as the track 120 moves to the right with respect to the heads 123 and 121, the phase of the resultant voltage will lag, while movement to the left of the central symmetrical position will make the resultant voltage lead the voltage when the track is centered over the two heads. This varying phase of signal can be used in a servo system to control the direction of rotation of a servomotor to position the track with respect to the heads.

Figure 14:
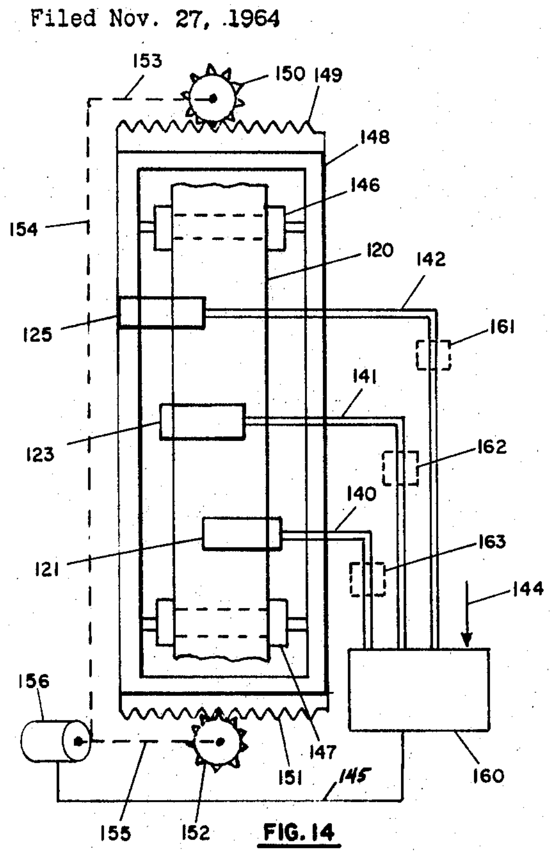
FIGURE 14 represents schematically a servomotor system for maintaining alignment between the heads and track of FIGURE 11.

This is shown schematically in FIGURE 14 in which the two heads 123 and 121 are shown connected by leads 141 and 140, respectively, to amplifier 160. Track 120 (shown for convenience as a separate strip) is guided by rollers 146, 147, in frame 148 which is supported, by means not shown, to be capable of movement transverse to the direction of motion of the tape over the rollers. Racks and pinions 149, 150, 151, 152, shafts 153, 154, 155, and motor 156, can cause transverse movement of the frame and thus of the strip or tape with respect to the heads. The control for the motor is derived from the amplifier 160 by leads 145. The amplifier receives its power by leads 144. The specific circuit by which the changing phase of the resultant signals from heads 123, 121, can cause the motor 156 to reposition the track with respect to the heads to a balanced alignment is well known in the art of electrical servomechanisms. This is well described in the art, in articles, patents, and books. One such system is described in my patent U.S. No. 2,820,907. One well known text book on servomechanisms is "Principles of Servo Mechanisms," by G. S. Brown and D. P. Campbell, J. Wiley and Sons, New York, 1948. There are many others.

Having shown how I can obtain a signal which varies in phase with the relative position of track and heads, there is no need to describe further the details of the servomechanism because it is well known in the art.

This servo system in conjunction with heads 123 and 121 can keep the track 120 aligned with heads 123 and 121 and if the geometry between tracks and between heads is correct, will keep track system 108, for example, aligned with heads 109. But how about the case when we want to shift to tracks 107, instead of 108? This is taken care of by head 125 positioned transversely and longitudinally with respect to 123, by the same distances as 123 is to 121. The transverse distance 127 is the same spacing as between one track of 108 and the adjacent track of 107. Consider that the track 120 is centered over heads 123, 121, FIGURE 11, covering ¾ of each head in a balanced condition. Now, let us switch the amplifier from leads 141 and 140 to leads 142 and 141. Now the leading head 125 has only ¼ of maximum signal while the trailing head 123 has ¾ maximum signal. This corresponds to resultant vector 134 and causes the track 120 to move to the left until it is centered over heads 125 and 123. In the meantime, if the track system 108 had been in alignment with heads 109, then track system 107 will now be in alignment. Thus by switching servo control from one pair of heads to the other, the tape can be shifted from one set of information tracks to the other, with reference to heads 109. Of course, if there are more than two sets of tracks systems 107 and 108, there can be additional pairs of heads, one extra head (such as 125) for each extra set of tracks (107).

Figure 15:
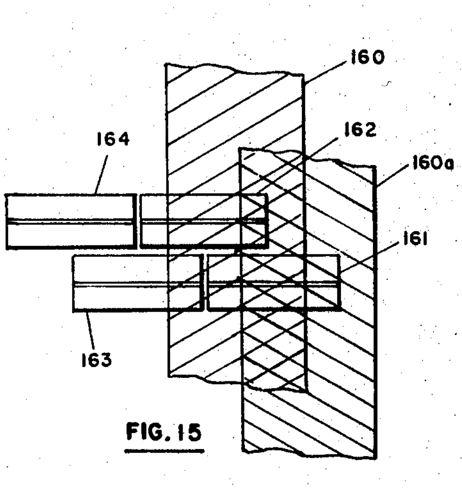
FIGURE 15 illustrates another embodiment of FIGURE 11.

Consider the case where we have a high frequency sinusoidal signal recorded on the track 120. Each of the heads 123 and 121 will record this high frequency signal. If we apply a rectifier to the output of each head, shown dotted as 161, 162, 163, etc. in FIGURE 14, we will then get direct current signals which will vary in magnitude as the amplitude of the A-C signals produced by the heads. Now by subtracting one from the other, as shown in FIGURE 13, where the vector 135 represents the signal on head 123 for position of track 120(*a*) and vector 136 represents that of head 121, when the track is in central position 120, the D-C voltages 137 and 136 are equal. Thus we can generalize that as the track moves to the right of center, a resultant D-C voltage of one polarity 170 develops, while a corresponding movement to the left of center will produce a voltage 171 of opposite polarity. This voltage 170, 171, can be used to control an appropriate servo motor system, as in FIGURE 14, to position the tape with respect to the heads. Thus, whether we use A-C from the heads, or rectify this A-C and use a D-C signal servomechanism, as is well known in the art (see U.S. No. 2,820,907), we can maintain alignment of tracks to a specific system of heads. Now if we use additional heads 161, 162, 163, 164, as in FIGURE 15, and by switching corresponding leads from 162 and 161 to 163 and 162, or 164 and 163, and so on, we can cause movement of the tape with respect to heads in increments of shift equal to the lateral spacing between heads 162 to 161, which preferably is equal to the spacing between tracks of the separate interleaved track systems, 107, 108. It is, of course, unimportant whether we hold the head array fixed and move the tape, or hold the tape fixed and move the heads. It is the relative movement that is important. Thus I have shown how a single control track and a multiplicity of heads in proper geometric relation can be used not only to guide the tape and a specific set of tracks with respect to a specific set of heads, but we can rapidly switch another set of tracks to these same heads and keep them in alignment.

In this system, the complete scanner consists of the head, detector, or reading elements 24, FIGURE 1, plus the central control unit (CCU) 33. This provides the electronic circuits to read and utilize the electrical pulses produced by the heads. The CCU is essentially a device similar to the central processing unit of a small digital computer. The line 40 of FIGURE 1 represents the lines from the CCU where the recorded information, read from the tape 20 is sent to be utilized, by recording on conventional magnetic tapes, digital disc file, digital drum storage, printer, cathode ray tube optical display, and so on.

Probably the most useful method of handling this information is to attach to the CCU (or computer central processing unit) a disc or drum storage. By this means, if advance information is available as to the addresses on the strips (that is, the THU, reel, section, etc) of the information required to be retrieved from storage on the strips 20, this information file can be searched in the most efficient order, and the information as retrieved, placed on the disc or drum, in predetermined address, to be called for as needed by the computer. This will make the information storage system "fast enough" to serve the digital computer.

The magnetic tape in conventional use can be a plastic strip on which is applied a uniform thin layer of iron oxide powder, or other magnetizable material. However, the tapes can also be thin strips of ferromagnetic metal, or ferromagnetic plating on nonferrous metal, or a thin ferromagnetic metallic layer deposited on plastic, or any combination, as is well known in the art. While I speak of strips, such as the conventional 7 track magnetic tapes used in digital computers, I mean to include also the wide strips or webs such as are used in videotape recorders and are illustrated in connection with FIGURE 8, and any other forms of magnetizable records than can be adapted to the indexing, positioning and reading systems illustrated and described in this application.

The pattern of magnetization can be any one of many different systems currently in use in the art. Some of these are illustrated in FIGURE 16. Each of the three figures (*a*), (*b*), and (*c*), represent a different pattern of magnetization. For example, (*a*) represents isolated patches of magnetization 201, 202, 203, each of the same magnetic polarity (+ for example). There may be a space 204 where two areas of magnetization could be present but are not. This is shown by the dotted outline 204. Thus, the presence or absence of magnetization can indicate information. The abscissa represents distance along the length of the tape. Since the track has finite width, lines 201, 202, 203, represent areas of (+) magnetization, which are each of uniform magnetization. There are spaces 205 between each area 201, 202, 203, etc., where the magnetization returns to zero. Thus the areas are isolated from each other.

FIGURE 16(*b*) shows a pattern of magnetization in which the track is continuously magnetized, either (+) or (−). Areas 207, 208, 209, etc., are (+) magnetization while 210, 211, etc., are (−) magnetization. There is no length of the track where the magnetization is zero. These magnetized areas are contiguous, so that the pattern which describes the information is one of magnetization, or of areas of magnetization of the same or opposite polarity. Both FIGURES 16(*a*) and 16(*b*) represent information in digital form. In the type of magnetization shown in FIGURES 16(*a*) and 16(*b*), the magnetized areas are generally saturated magnetically, and thus are all of equal magnetization, although possibly of opposite polarity.

FIGURE 16(*c*) represents analog information, that is, information in the form of a continuous curve or function. This may have portions 212, 213, 214, etc., where the magnetization is (+) and areas 215, 216, where the magnetization is (−). However, the degree of magnetization, or magnetic field strength or intensity, is generally continuously variable from low values to high, and vice versa. In this respect, the analog record differs from the digital records, FIGURES 16(*a*) and 16(*b*) where the magnetized areas are of uniform magnetization, generally the value of saturation.

In FIGURE 16(*c*) it can be said that the information is represented by the pattern of magnetization, that is, intensity of magnetization, or areas of (+) or (−) magnetization, etc. In general, the digital computer uses tapes magnetized in accordance with FIGURES 16(*a*) and 16(*b*). The videotape generally uses the types of magnetization shown in FIGURE 16(*c*).

Whether the form of the magnetic track is of one or another of these shown in FIGURE 16, or whether analog or digital recording is used is immaterial in this invention, which is directed to the retrieval of information from such record strips, whatever their form. So long as the scanner can read the magnetically recorded information, the benefits of my invention can be enjoyed.

When I mention in the specification or the claims the phrases, "pattern of spots," "pattern of areas," or "pattern of magnetization," I refer to the types of patterns such as those illustrated in FIGURE 16, any combination of them, or any other patterns of reproducible information recording which may be known and used in the art. Although it was not specifically disclosed in my copending application, S.N. 158,000, it will be clear that the photographic information tracks illustrated there can be of the types illustrated in FIGURE 16.

It will be clear also, that while I have discussed this information system as an information *retrieval* system, all of its advantages can be applied also to information recording. Thus the recording strip in a specified SHU can be positioned to the specified section, and information recorded thereon by the magnetic heads of the scanner under the control of the CCU. So while I speak of a "scanner," or "scanner system," or "scanner heads," I mean to include in such terms the step of "recording" information of a digital or analog nature magnetically, as well as the step of "reading" such information. Of course, the section indicia, section index detectors, and the control systems to position the strips are required whether the operation to be performed on the strip is to record or to read.

In this description I have used the terms "central processing means" or "scanner," and "central control means" and "reading means" or "head means." By the use of the term central processing means or scanner, I mean also to include reading means in combination with central control means to utilize the signals from the reading means. The central processing means can be an assembly, including reading means, such as illustrated in FIGURE 8, that is placed in operating relation successively with a plurality of records by physically moving the assembly from one record to another. The reading means, in this case, is permanently connected to the central control means. The central processing means also can comprise a plurality of reading means, such as illustrated in FIGURE 5(*a*), each in a separate record handling means, in combination with switching means to successively connect the central control means to each of the reading means.

While I have described and pointed out the fundamental novel features of my invention and have described it in connection with a number of specific modifications and embodiments, it will be understood that various changes, substitutions, additions, and omissions in the form and detail of the devices illustrated, and in their operation, may be made by those skilled in the art without departing from the spirit of my invention. For example, any type of nonphotographic recording can be utilized in the preparation of the record strips and appropriate scanning means used to read the information thereon. Also, the section indexes can be of any desired physico-chemical nature with appropriate section index detectors. Also, all of the details of the photographic section, as described in my copending application, S.N. 158,000 modified to be appropriate for the magnetic or other nonphotographic recording, can be utilized in connection with this invention. It is my intention therefore to be limited only as indicated by the scope of the appended claims.

I claim:

1. In an information system in which information is recorded on a magnetizable strip record at least part of said information being recorded in the form of patterns of magnetization arranged in at least one array of magnetized areas, a multiplicity of said strips adapted to be run independently and simultaneously through a multiplicity of strip handling means, the improvement comprising, index means marking a multiplicity of predetermined sections on each of said strips, means associated with each strip handling means to detect said index means, and to simultaneously drive and position said strips to desired sections in said handling means, magnetic reading means in each of said handling means in operating relation to the strips in said handling means, central control means, and means to connect said control means successively and selectively to each of said reading means to read said information.

2. An information record for use in storing information in the form of a pattern of magnetized areas on a magnetizable strip record medium in an information retrieval system in which a multiplicity of said strip records are run simultaneously respectively past a multiplicity of magnetic head means each in a strip record handling means, central control means, and means to connect each of said heads in said handling means successively and selectively to said central control means for reading said magnetic information by each of said heads, each of said strip record handling means having index detection means, comprising, (a) a magnetizable strip record, (b) information recorded on said strip record in the form of patterns of magnetized areas, (c) at least part of said information in the form of a pattern of magnetization arranged in at least one array of magnetized areas, and, (d) index means associated with each of said strip records having at least one property recognizable by said index detection means for marking specific dividing points in the magnetized areas on said strip record.

3. In an information retrieval system comprising at least one magnetic record strip carrying information, adapted to be run in a record strip handling means including magnetic head means for reading said information, the improvement comprising, (a) a track of magnetized areas on said record strip,
(b) at least two magnetic head means displaced from each other transverse to the direction of said track by a fraction of their width, and displaced from each other along the direction of said track and in operating relation with said track, the width of said heads greater than one-half the width of said track,
(c) a time varying signal recorded on said track,
(d) amplifier means adapted to utilize the time varying signals generated by said head means when said track is traversed past said head means to provide control signals, and,
(e) means including servomotor means responsive to said control signals to relatively transversely position said record strip and said heads.

4. Apparatus as in claim 3 in which said heads are individually the same width as said track and are displaced transversely by half of their width.

5. Apparatus as in claim 3 including at least three heads, equal in width to each other and to said track, a second head displaced transversely one-half its width from a first head, and a third head displaced transversely by one-half its width from said second head and by its full width from said first head, said amplifier adapted to be connected successively to either pair of heads which are displaced from each other by half their width.

6. In a magnetic information system for the storage and retrieval of information, at least part of which is in the form of patterns of magnetization arranged in a multiplicity of arrays of magnetized areas on a magnetic record strip, the improvement comprising, (a) a multiplicity of record strip handling means, each capable of storing, driving, index detecting, and controlling at least one record strip, including means to relatively move said record strip in said record strip handling means and information reading means independently of and simultaneously with said other record strip handling means,
(b) a multiplicity of magnetic record strip means on which the information is stored in the form of patterns of magnetized areas, at least one record strip being placed in each handling means,
(c) central processing means including magnetic reading means for reading the information on said record strips, and means for moving said reading means in a direction substantially perpendicular to the direction of movement of said record strips,
(d) means for placing said central processing means in operating relation selectively and successively with each of said handling means,
(e) index means associated with each of said record strips to mark the positons of a multiplicity of sections of said record strips, each section including at least one array of magnetized areas, and
(f) index detecting means associated with each of said record strip handling means and control means responsive to said detecting means to relatively position said record strips and said reading means in said handling means to predetermined sections on said record strips.

7. Apparatus as in claim 6 in which said magnetic reading means in said central processing means is adapted to be placed mechanically in operating relation successively with each of said record strips in each of said record strip handling means.

8. Apparatus as in claim 6 in which said magnetic reading means of said central processing means includes magnetic head means in each of said handling means, central control means, and means to connect each of said head means successively to said central control means.

9. In an information retrieval procedure in which a multiplicity of magnetic strip records are traversed past a multiplicity of magnetic reading means in a multiplicity of strip record handling means, means for connecting said reading means selectively and successively to a central control means to read said strip records, each strip record handling means having rough positioning means by means of which said strip records can be pre-positioned to predetermined sections of said strip records, the method of reading said strip records comprising the steps of reading the strip record in one reading position in one strip handling means while simultaneously rough positioning the strip record in at least one other strip record handling means to a predetermined position by said positioning means.

10. In a magnetic information system in which information is recorded on a magnetic record strip, at least part of said information being arranged in patterns of magnetization in a multiplicity of arrays of magnetized areas, a multiplicity of said record strips adapted to be run independently and simultaneously in a multiplicity of record strip handling means, the improvement comprising, index means associated with each of said magnetic record strips marking a multiplicity of predetermined sections on each of said record strips, means associated with each of said record strip handling means to detect said index means and to position said record strips, magnetic reading means in each of said handling means and means in each of said handling means to relatively position said record strips and said reading means to desired sections in said handling means, central control means and means to connect said central control means selectively and successively to each of said reading means in said handling means to read said information.

11. In a magnetic information system for the storage and retrieval of information, at least part of which is in the form of patterns of magnetization arranged in multiple arrays of magnetized areas on a magnetic strip record medium, the improvement comprising, (a) a multiplicity of magnetic strip records on which the information is stored in the form of patterns of magnetized areas,
(b) a multiplicity of strip record handling means each capable of storing, driving and simultaneously positioning, each to a different position, a multiplicity of magnetic strip records, at least one in each handling means,
(c) central processing means including magnetic reading means for reading the information in said strip records, and means for moving said reading means in a direction substantially perpendicular to the direction of movement of said strip record, and
(d) means for placing said central processing means in operating relation selectively and successively with each of said strip records in said strip record handling means.

12. In a magnetic information storage system in which information is stored in the form of patterns of magnetized areas on a magnetizable strip record, the improvement comprising, a plurality of magnetizable strip records, the information recorded on said strip records in the form of a plurality of arrays of magnetized areas,
a plurality of strip record handling devices, each of said devices holding at least one strip record, magnetic reading means in each of said devices in operating relation to said at least one strip record, and means for moving said reading means in a direction substantially perpendicular to the direction of movement of said strip record,
index means associated with each of said strip record for dividing said plurality of arrays into a plurality of predetermined sections on each of said strip records and means associated with each of said strip record handling devices to detect said index means positioning means associated with each of said handling devices responsive to said index detecting means for relatively positioning said strip record and said reading means so as to relatively position a selected array of magnetized areas in predetermined relation to said reading means, central control means, and means to connect said central control means sequentially and selectively to each of said reading means in each of said devices.

13. Apparatus for controlling the transverse position of a magnetic transducer relative to a magnetic track carrying a time-varying signal recorded on a magnetizable record strip, comprising, (a) a pair of magnetic reading elements in said transducer, the effective width of each element being greater than one-half of the width of said recorded track, (b) said read elements displaced from each other in a direction perpendicular to the direction of said track by a fraction of their width and displaced from each other in the direction of said track, (c) each of said elements producing signals in response to the relative longitudinal movement between said record strip and said elements, said signals being in accordance with the time-varying signal on said track, the relative magnitude of said signals from each of said elements varying in accordance with the transverse position of said elements with respect to said track, and (d) servo means, including positioning means, responsive to said variation in the relative magnitudes of said signals for relatively transversely positioning said elements and said track.

14. Apparatus as in claim 13 in which said recorded signal is a sinusoidal signal, the frequency of which is related to the longitudinal spacing of said elements and the velocity of said record strip.

15. Apparatus as in claim 13 in which said servo means includes means to rectify the signals from said elements.

References Cited

UNITED STATES PATENTS

| | | | |
|---|---|---|---|
| 3,246,307 | 4/1966 | Stanley ----------- | 340—174.1 |
| 3,179,001 | 4/1965 | Silverman ------------ | 88—24 |

BERNARD KONICK, *Primary Examiner.*

A. I. NEUSTADT, *Assistant Examiner.*

U.S. Cl. X.R.

179—100.2